United States Patent [19]

Franke

[11] 4,392,557

[45] Jul. 12, 1983

[54] MECHANICAL ACTUATING DEVICE FOR A SPOT-TYPE DISC BRAKE

[75] Inventor: Helmut Franke, Wehrheim, Fed. Rep. of Germany

[73] Assignee: ITT Industries, Inc., New York, N.Y.

[21] Appl. No.: 199,907

[22] Filed: Oct. 23, 1980

[30] Foreign Application Priority Data

Nov. 20, 1979 [DE] Fed. Rep. of Germany ....... 2946853

[51] Int. Cl.³ ...................... F16D 65/52; F16D 65/16
[52] U.S. Cl. .................................. 188/71.9; 188/72.8
[58] Field of Search .................... 188/71.8, 71.9, 72.6, 188/72.7, 72.8, 196 BA, 196 B, 196 D, 196 P; 192/111 A

[56] References Cited

U.S. PATENT DOCUMENTS

| | | | |
|---|---|---|---|
| 3,976,168 | 8/1976 | Yamaoto | 188/72.8 X |
| 4,031,985 | 6/1977 | Ito | 188/71.9 |
| 4,084,664 | 4/1978 | Haraikawa | 188/71.9 |
| 4,180,146 | 12/1979 | Airheart | 188/71.9 |

FOREIGN PATENT DOCUMENTS

| | | | |
|---|---|---|---|
| 1575996 | 2/1967 | Fed. Rep. of Germany . | |
| 2063398 | 6/1981 | United Kingdom | 188/71.9 |
| 2063399 | 6/1981 | United Kingdom | 188/71.9 |
| 2063401 | 6/1981 | United Kingdom | 188/71.9 |
| 2064030 | 6/1981 | United Kingdom | 188/71.9 |

Primary Examiner—Douglas C. Butler
Attorney, Agent, or Firm—John T. O'Halloran; Alfred C. Hill

[57] ABSTRACT

Mechanical actuating devices for disc brakes known in the art are of complicated construction and are composed of a large number of parts. The actuating device of the present invention reduces the number of parts by providing an actuating nut with an adjusting screw thread on its outer surface and by disposing the actuating nut in a threaded bore of an actuating or brake piston movably guided in a cylindrical bore of the brake caliper. The actuating nut and brake piston from an automatic brake clearance adjusting device in which the brake piston is progressively moved toward the brake disc on the actuating nut when the actuating stroke exceeds a predetermined amount due to wear of the brake pads.

48 Claims, 4 Drawing Figures

MECHANICAL ACTUATING DEVICE FOR A SPOT-TYPE DISC BRAKE

BACKGROUND OF THE INVENTION

The present invention relates to a mechanical actuating device for a spot-type disc brake comprising a brake caliper embracing the brake disc inwardly or outwardly, the brake caliper including at least one axial circular bore which incorporates therein a substantially cylindrical hollow brake piston acting on one brake shoe via an intermediate plate if necessary, an actuating spindle arranged axially in the brake piston and adapted to be turned around its axis by means of an actuating means, the actuating spindle cooperating with an actuating nut also disposed in the brake piston and abutting with its outer surface at least partly the inner wall of the one brake shoe such that the brake piston is advanced upon an axial relative displacement between the spindle and the nut caused by the actuating spindle being turned, and with an automatic adjusting device for the brake piston arranged likewise in the brake piston. The present invention refers in particular to a special design of a floating caliper brake, namely to a so-called fist-type caliper brake, in which one single bridge embraces the brake disc fist-like.

In a known spot-type disc brake adapted to be actuated both hydraulically and mechanically (German Patent DE-AS No. 15 75 996), the brake piston is located axially freely slidably on the actuating nut and is for actuation subjected from the inside to an adjusting spindle cooperating with the adjusting device. The known brake is composed by a comparatively great number of components, and the actuating force acts on the bottom of the brake piston through a surface of the adjusting spindle which is relatively small. The resetting of the adjusting device after a lining renewal is problematic. Construction and assembly of the known brake are also rather costly.

SUMMARY OF THE INVENTION

It is an object of the present invention to provide a mechanical actuating device for a spot-type disc brake, in particular, for a fist-type caliper brake of the type referred to hereinabove, which device is constructed by the smallest possible number of components, in which the brake piston abuts the brake shoe or an intermediary member on a surface which is furthest removed outwardly from the longitudinal axis of the piston and in which a good axial guidance of all axially adjustable components is guaranteed. In addition, the present invention intends to offer a simple and unproblematic solution for the resetting of the adjusting device after replacement of a worn brake shoe by a new one.

A feature of the present invention is the provision of a mechanical actuating device for a spot-type disc brake comprising: a brake caliper embracing the outer periphery of a brake disc, the caliper including at least one axial cylindrical bore; a hollow substantially cylindrical brake piston disposed in the axial bore acting on one brake shoe of the disc brake; an actuating spindle disposed coaxially in the brake piston and adapted to be turned around its axis by an actuating means coupled thereto; an actuating nut disposed coaxially in the brake piston between the brake piston and the actuating spindle and in a cooperating relationship with the actuating spindle, the actuating nut having on a portion of the outer surface thereof a first thread engaging a second thread associated with the brake piston, the actuating nut being secured to prevent rotation thereof by a rotation-preventing means; an automatic brake clearance adjusting device for the brake piston including the first and second threads and a clutch device associated with the spindle to accomplish an axial adjustment of the brake piston when a predetermined nominal brake clearance has been exceeded upon actuation of the disc brake.

In particular, the construction should be such that the outer surface of the actuating nut and the inner surface of the brake piston, or an adjusting nut predeterminedly secured to the inner surface of the brake piston are provided with engaged adjusting threads and that the clutch device, arranged between the actuating spindle and the brake piston or adjusting nut, turnable within the bore, entrains the brake piston neither in the actuating or in the opposite direction within a turning capacity of the actuating spindle corresponding to the nominal clearance. However, the clutch device effects a rotary motion after the nominal clearance is exceeded during actuation, which rotary motion relative to the actuating spindle is opposite the actuating direction of rotation and corresponding to the amount the nominal clearance is exceeded. The clutch device then causes the brake piston or the adjusting nut to rotate accordingly when the actuating spindle returns to its initial position prior to actuation.

Due to this construction, only three construction units, which are located very compactly and coaxially to each other, are required to realize both the brake actuation and the brake clearance adjustment. Due to this, the mechanical member, i.e., the brake piston, acting on the brake shoe being directly actuated is located as far out as possible from the longitudinal axis so that a maximum abutment surface is provided at the backing plate of the directly actuated brake shoe, or at an intermediate plate that may be provided.

To allow the smallest possible amount of friction between the actuating spindle and the actuating nut, the thread between these two parts is preferably constructed as a ball bearing thread with an internal ball guide return tube. The actuating spindle is supported preferably by an axial roller bearing or a needle bearing at its closed front surface of the bore remote from the brake shoe.

The final assembly of the brake in accordance with the present invention is very simple, since the three components arranged coaxially in each other are able to be assembled prior to the final assembly and may then be simply inserted in the bore in the inner leg of the fist-type caliper.

The clutch device is suitably located in the direction of the brake shoe axially subsequent to the thread on the actuating spindle and is advantageously provided with a radial nose which engages in a circumferential recess of the brake piston or of the adjusting nut, the circumferential length of this recess corresponds to the nominal clearance. It is also possible to have the nose formed in the brake piston or adjusting nut and have the circumferential recess in the clutch device.

According to a first advantageous embodiment, the clutch device may be a disc which is located in friction contact on the spindle and having the nose disposed on the periphery of the disc. Another advantageous possibility is that the clutch device may be a one-way clutch fitted to the spindle with the nose located on the outer swivel part thereof.

A simple resetting of the adjusting device after a brake shoe replacement may be realized in that the rotation-preventing unit of the actuating nut is adapted to be released, the actuating nut and the actuating spindle are adapted to be locked with each other against rotational movement and the brake piston or the adjusting nut are adapted to be secured against rotation. Due to this construction, a return rotation of the nut is allowed to occur relative to the locked brake piston when the spindle turns back entraining the nut.

A practical realization of this is characterized in that the brake piston includes an axial groove at its periphery in which a rotation-preventing pin arranged at the brake caliper is adapted to slide. It can be provided furthermore, that the actuating nut extends along the end portion remote from the brake shoe radially past the brake piston up to the bore end and is there provided with at least one longitudinal slot in which a rotation-preventing pin enters from the floating caliper. Besides, the actuating nut incorporates advantageously a central recess in the range of the rotation-preventing unit, in which recess the radial flange of the actuating spindle is located, which radial flange includes at its periphery a radial bore and a tappet disposed therein and subjected to a spring, which tappet is adapted to align with the longitudinal slot of the actuating nut and may catch this nut when the rotation-preventing pin is withdrawn.

The advantages of the present invention are that a high efficiency may be achieved with a minimum mounting space and that a wedge-shaped wear of the brake shoes is largely avoided on account of the defined guidance of the annular brake piston in the caliper leg. The friction between spindle and nut is kept to a low value by using a ball bearing spindle and a ball bearing nut with internal ball guide return. Moreover, a direct force transmission is provided. The pressure surface of the piston on the brake shoe is comparatively large. The mounting of the relatively small number of parts is easily effected. Likewise, the pad renewal can be carried out without any difficulty.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
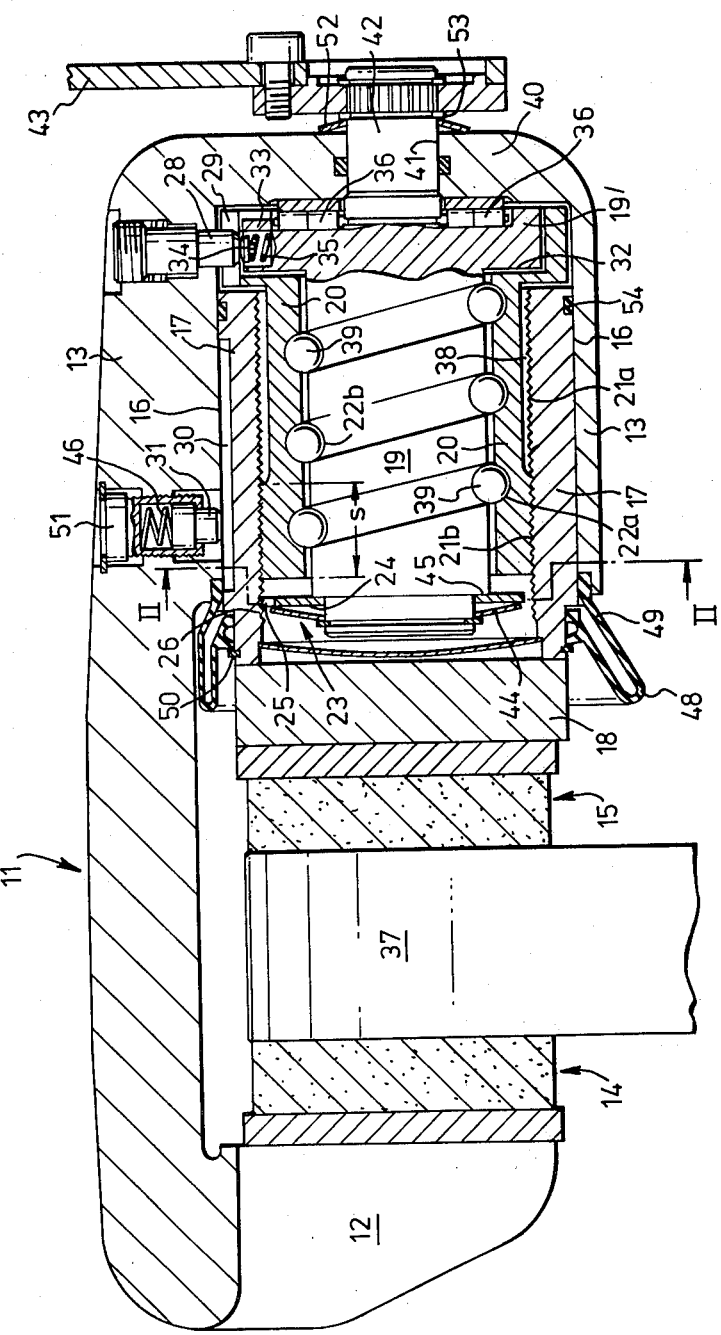
FIG. 1 is a longitudinal cross sectional view of a first embodiment of a fist-type caliper brake in accordance with the principles of the present invention.

According to FIG. 1, a fist-type caliper 11 extends axially around the outer edge of a brake disc 37. The leg 12 situated at the outside carrier brake shoe 14 which is indirectly actuated by caliper 11 towards disc 37. The inside leg 13 of fist-type caliper 11 is provided with an axial bore 16 in which a cylindrical brake piston 17 is slidably arranged. The front end annular surface of brake piston 17, close to brake disc 37, acts on a large area of an intermediate plate 18 which is in communication with the inner brake shoe 15.

On the inside wall of brake piston 17 an adjusting thread 21a is located which cooperates with a thread 21b disposed at the outside surface of an actuating nut 20. While thread 21a at brake piston 17 extends over almost its entire length, thread 21b is provided on actuating nut 20 only along a comparatively short distance thereof at the end close to brake disc 37. Along the majority of its length, the outside surface of actuating nut 20 is radially spaced from the inside surface of brake piston 17, this space is indicated in FIG. 1 by reference numeral 38.

Actuating nut 20 is likewise constructed cylindrical and includes a ball bearing thread having balls 39 on its inside surface cooperating with an outside ball bearing thread 22b of an actuating spindle 19 located on the inside of nut 20. The return guide tube for thread balls 39, lined up close to each other, is located inside actuating spindle 19 otherwise solidly constructed. However, this return guide tube is not shown in the drawing.

Actuating spindle 19 has a radially projecting flange 19' at the end thereof remote from brake disc 37. Flange 19' bears against the closed end wall 40 of bore 16 via an axial roller bearing or a needle bearing 36. Wall 40 includes axially thereof an axial bore 41, through which an actuating pivot 42 of spindle 19 extends outwardly. An actuating lever 43 is fastened at the end of actuating pivot 42.

In the area of radial flange 19', actuating nut 20 projects outwardly up to the inner wall of bore 16. Brake piston 17 does not extend entirely up to the end of bore 16 in order to provide for the space required for this projection on actuating nut 20.

Provided in the area of actuating nut 20, which projects radially up to bore 16, is a central recess 32, in which radial flange 19' of actuating spindle 19 is located.

In that portion of actuating nut 20 projecting radially up to the wall of bore 16, actuating nut 20 has a longitudinal slot 29 which cooperates with a radial rotation-preventing pin 28 located in leg 13. Pin 28 is shown in FIG. 1 in its state of being screwed into slot 29.

In the rotational position of spindle 19 illustrated in FIG. 1, opposite longitudinal slot 29 lies a radial bore 33 in flange 19'. A tappet 34 is located in bore 33 subjected radially outwardly to the force of a spring 35. If from the position illustrated in FIG. 1, rotation-preventing pin 28 is turned out of the longitudinal slot 29, tappet 34 will move into longitudinal slot 29 under the influence of spring 35. As a result of this, the rotation-preventing mechanism of actuating nut 20, effected by pin 28, is released, while actuating spindle 19 is simultaneously connected with actuating nut 20 to lock each other against rotational movement. This arrangement is provided for the resetting of the adjusting device to be described hereinbelow.

Figure 2:
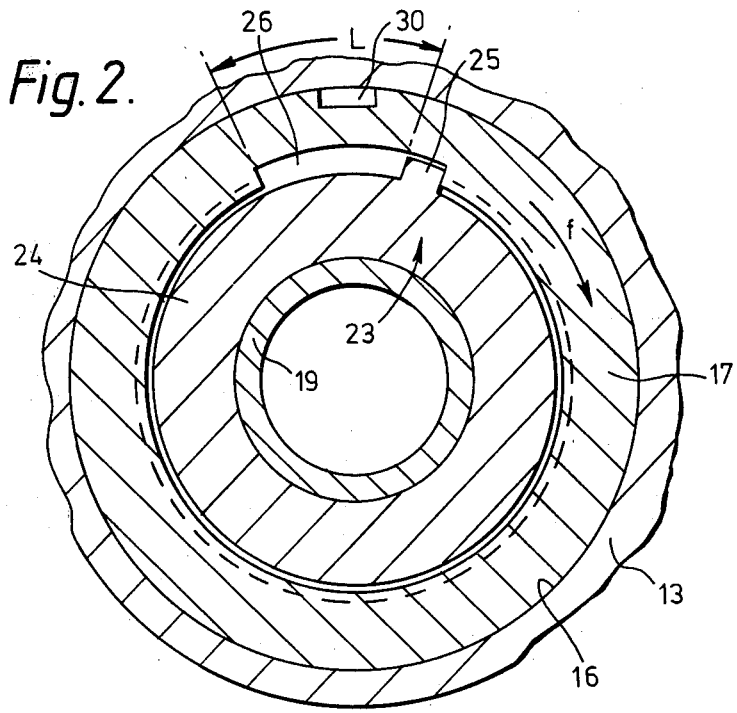
FIG. 2 is a section taken along the line II—II of FIG. 1.

Provided at the end portion remote from wall 40 is a clutch device 23, including, according to FIGS. 1 and 2, an annular disc 24 seated coaxially in friction contact with the adjacent end of actuating spindle 19, a nose 25 projecting radially from disc 24 and a recess 26 on the inside wall of brake piston 17. A spring retainer 44 presses annular disc 24 against an annular step 45 in spindle 19 in such a manner that a friction contact occurs which is required for the brake clearance adjustment.

In the circumferential direction, recess 26 extends over a distance L which corresponds to the brake clearance. In the axial direction, said recess extends over a distance corresponding to the maximum adjusting length.

Brake piston 17 includes an axial groove 30 in its outer surface, in which groove a rotation-preventing pin 31 can be screwed from the outside of leg 13.

The brake is ready for operation with the arrangement of pins 28 and 31 and tappet 34 is illustrated in FIGS. 1 and 2. Upon a rotary movement of actuating lever 43, actuating nut 20 together with brake piston 17 will be shifted axially in the direction of brake disc 37, so that brake shoes 14 and 15 will abut brake disc 37. During this time, nose 25 covers the distance L within recess 26 indicated in FIG. 2. Threads 22a and 22b, will be a left-hand thread in this case.

However, nose 25 will strike the left-hand end portion in recess 26 of FIG. 2 during actuation when the wear of the brake pads increases. Actuating spindle 19 will rotate relative to disc 24, locked at that point of time in recess 26, when the friction contact is overcome at reference numeral 45 by an amount corresponding to the amount of brake pad wear exceeding the nominal brake pad clearance.

It is not possible at this stage to entrain piston 17 to execute a rotation, because a rotation of piston 17 is impeded by the front surface of brake piston 17 bearing against brake shoe 15 and by the axial force in threads 21a and 21b.

If the braking operation is terminated now, actuating lever 43 swivels back and simultaneously entrains actuating spindle 19. From then on, radial nose 25 will strike the right-hand end portion of recess 26 in FIG. 2 of recess 26 before actuating spindle 19 has entirely returned to its starting position. Since piston 17 is no longer pressed against brake shoe 15, and threads 21a and 21b ae largely free from axial forces, piston 17 may rotate within bore 16 comparatively at ease. The torque exerted on piston 17 at reference numeral 45 by means of the friction contact and of nose 25 in the sense of the arrow f in FIG. 2 is now sufficient to cause piston 17 to execute a clockwise rotation which will have, as a result, such an axial movement of brake piston 17 relative to actuating nut 20, that the brake pad clearance is reduced.

A sealing diaphragm 48 adapted to be enlarged like a bellows extends between the front end of the outer surface of brake piston 17 and leg 13, which diaphragm is arranged—in accordance with the present invention—turnable relative to piston 17 in an indentation 49 disposed in the end of piston 17. Diaphragm 48 is retained in indentation 49 by a retainer spring 50. A certain friction between a piston sealing ring 54 and leg 13 prevents, for example, torsion of piston 17, coincidentally possible due to vibrations. Consequently, piston sealing ring 54 stabilizes brake piston 17 in the position obtained after clearance adjustment has been made without impairing the adjustment itself.

In addition, it is important that the amount of friction force within threads 21a and 21b is greater than the amount of friction force of threads 22a and 22b, in order to enable a rotation between components 19 and 20 and not between components 17 and 20 when the brake is actuated.

In the brake's released position, actuating lever 43 bears against a stop not illustrated in the drawing.

Thus, clutch device 23 of the embodiment described in FIGS. 1 and 2 operates due to a friction force initiated by retainer spring 44, the force being of equal magnitude in both directions of rotation of actuating spindle 19. Therefore, the adjusting step is only possible, if the friction of threads 21a and 21b increases to such an extent due to the actuating force when the brake is applied, that the friction of clutch device 23 is overcome and thereby slips. The adjusting device, hence, does not take action upon actuations which do not result in the build-up of an actuating force, because the actuating travel does not suffice to apply the brake shoes to the brake disc. This may occur, for example, if the brake clearance has not been correctly adjusted during the fitting of new brake shoes. An actuation of the brake is but possible, if a new adjustment of the basic clearance is carried out.

Figure 3:
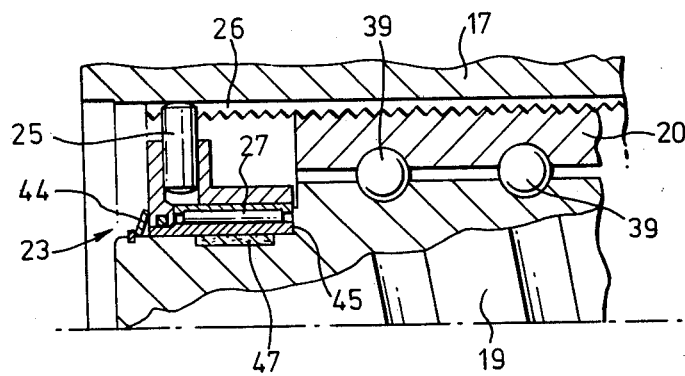
FIG. 3 is a section through a detail analogous to FIG. 1 of a second embodiment of a fist-type caliper brake in accordance with the principles of the present invention employing a one-way clutch.

FIG. 3 shows an embodiment in which the adjustment is non-responsive of the occurrence of an actuating force. At the end of actuating spindle 19 close to brake disc 37, a one-way clutch 27 is located above a friction lining 47. From the outwardly projecting part of clutch 27 nose 25 extends radially into recess 26 of brake piston 17. The one-way clutch is held by a retainer spring 44 is an annular step 45 in actuating spindle 19. The mode of operation is analogous to the embodiment of FIGS. 1 and 2, with greater entraining forces being permitted, on the one hand, to be exerted on brake piston 17 during the resetting of actuating lever 43 on account of the effect of the one-way clutch, whereas, on the other hand, practically no torques are transmitted to brake piston 17 upon actuation of the brake when nose 25 strikes the end of recess 26.

Thus, the amount of friction of one-way clutch 27 is in any case smaller than the amount of friction in the adjusting thread—due to the clutch's construction and its diameter in the released position—even if the adjusting arrangement is not loaded by an actuating force pressing the brake shoes against the brake disc, but only by the displacement force at brake piston 17. This way, the adjusting device operates, even if the brake shoes do not get in abutment with the brake disc. Therefore, the brake shoes may be urged into a 'ready-to-work' position by repeatedly applying the barke in case of an unfavorable presetting of the brake pad clearance.

If replacement of worn brake shoes 14 and 15 by new ones is desired, the adjusting device will be first reset in the following way:

The rotation-preventing pin 28 located in a tapped hole of leg 13 will be turned out of longitudinal slot 29. At this, tappet 34 is partly moved into longitudinal slot 29 due to the effect of spring 35. Actuating spindle 19 and actuating nut 20 are now locked with each other against rotational movement. In addition, rotation-preventing pin 31 is screwed in axial groove 30 of brake piston 17 by means of a set-screw 51 provided in leg 13. In case groove 30 is for the present not aligned with pin 31, pin 31 is able to displace radially against the force of a spring 46 located between pin 31 and screw 51.

With the actuating lever 43 or the actuating pivot 42 being turned back (clockwise in FIG. 2), annular brake piston 17 is first entrained by the element 19 and 20 and threads 21a and 21b as well as by disc 24 to effect a rotation, until axial groove 30 is aligned with rotation-preventing pin 31. As soon as this is the case, pin 31 catches groove 30 and prevents a further rotation of piston 17. Now a relative rotation takes place between the elements 19 and 20, on the one hand, and brake piston 17, on the other hand, with brake piston 17 first being moved out of bore 16 a maximum amount by the effect of the left-hand threads 21a and 21b, and then being successively withdrawn again into bore 16 up to its starting position. The starting position is illustrated in FIG. 1. Spindle 19 is kept in abutment with needle bearing 36 by means of retainer spring 52 located between the outer end surface of leg 13 and a circlip 53 at actuating pivot 42.

Friction lining 47 according to FIG. 3 is necessary in order to enable a sliding motion between one-way clutch 27 and spindle 19 when spindle 19 is reset.

Threads 21a and 21b in brake piston 17 and actuating nut 20 are constructed to be self-locking.

Figure 4:
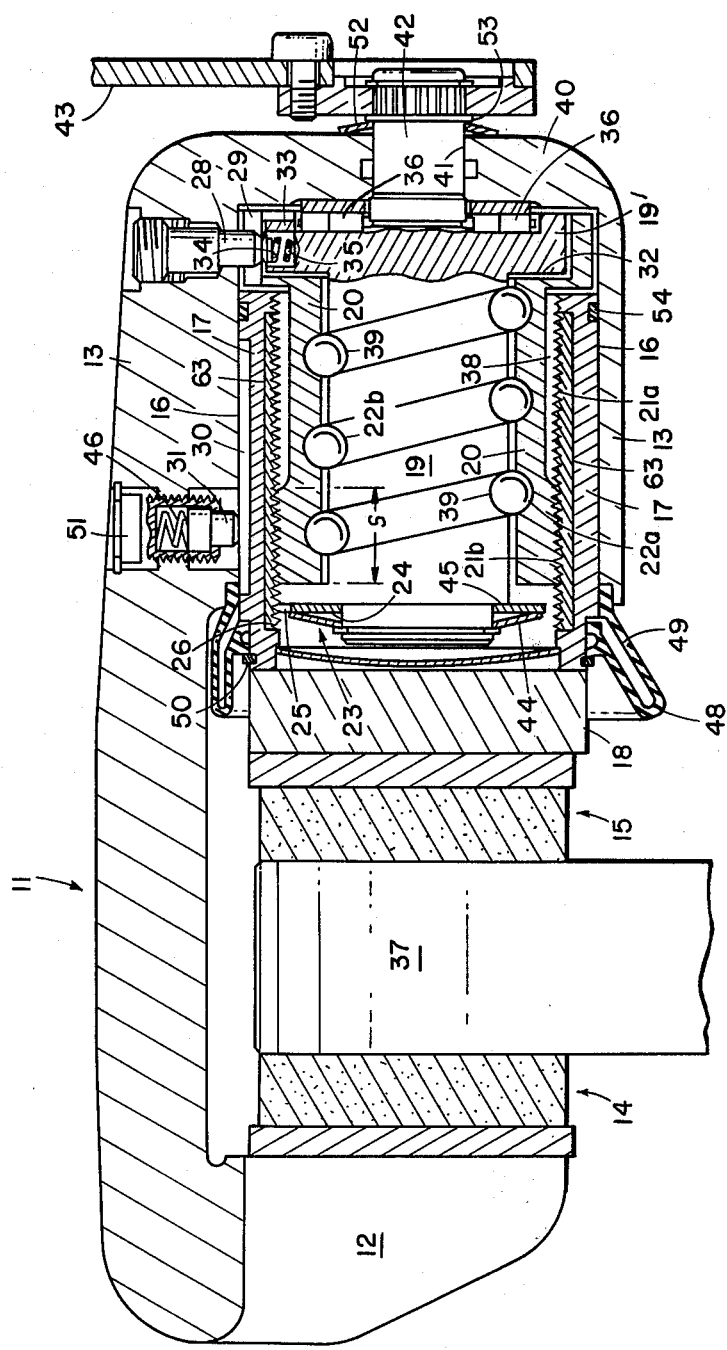
FIG. 4 is a longitudinal cross sectional view of a third embodiment of a fist-type caliper brake in accordance with the principles of the present invention.

Another alternative embodiment is shown in FIG. 4, in which brake piston 17 is arranged axially shiftably, but untwistably slidable in bore 16. Incorporated in the piston's interior is an adjusting nut 63, twistable relative to piston 17, but axially unshiftably, internal thread 21a of adjusting nut 63 cooperating with external thread 21b of actuating nut 20. Adjusting nut 63 could also be constructed substantially shorter than it is illustrated in FIG. 4, resulting in the necessity of constructing the adjusting thread 21b on actuating nut 20 correspondingly longer. A clutch device similar to FIG. 1 is shown in FIG. 4, but like FIG. 4 the clutch device can be replaced by the clutch device of FIG. 3.

The advantage of such a construction is that no rotation-slide connection would be required between the dust boot 48 and the brake piston 17. Likewise, adjusting nut 63 could be constructed relatively short like a genuine nut, whereas adjusting thread 21b would have to extend over the entire length of actuating nut 20—as mentioned before.

Instead of groove 30, a through-slot could be provided in brake piston 17 for rotation-preventing purposes upon resetting of the adjusting device, while actuating nut 63 has an axial groove analogous to groove 30 over its periphery not illustrated in the drawing. Pin 31 should be permitted to project inwardly a sufficient amount so that it is able to secure adjusting nut 63 against rotation by catching the axial groove of adjusting nut 63.

While I have described above the principles of my invention in connection with specific apparatus, it is to be clearly understood that this description is made only by way of example and not as a limitation to the scope of my invention as set forth in the objects thereof and in the accompanying claims.

I claim:

1. A mechanical actuating device for a spot-type disc brake comprising:
    a brake caliper embracing the outer periphery of a brake disc; said caliper including at least one axial cylindrical bore;
    a hollow substantially cylindrical brake piston diposed in said axial bore acting on one brake shoe of said disc brake;
    an actuating spindle disposed coaxially in said brake piston and adapted to be turned around its axis by an actuating means coupled thereto;
    an actuating nut disposed coaxially in said brake piston between said brake piston and said actuating spindle and in a cooperating relationship with said actuating spindle, said actuating nut having on a portion of the outer surface thereof a first thread engaging a second thread associated with said brake piston, said actuating nut being secured to prevent rotation thereof by a rotation-preventing means; and
    an automatic brake clearance adjusting device for said brake piston including said first and second threads and a clutch device coupled to said spindle to accomplish an axial adjustment of said brake piston when a predeteterminaed nominal brake clearance has been exceeded upon actuation of said disc brake.

2. An acutating device according to claim 1, wherein said brake piston is free to rotate in said axial bore and includes on the inner surface thereof said second thread,
    said clutch device acts on adjacent ends of said brake piston and said spindle, and
    said adjustment is effected by said brake piston being turned in said first and second threads by means of said actuating spindle turning back after said actuation through said clutch device.

3. An actuating device according to claim 2, further including
    a ball bearing thread disposed between said actuating spindle and said actuating nut.

4. An actuating device according to claim 2, wherein said clutch device is rotatable within said brake piston when said predetermined clearance has not been exceeded and entrains said brake piston when said predetermined clearance has been exceeded to cause a rotation of said brake piston to effect said adjustment when said actuating spindle turns back after said actuation.

5. An actuating device according to claim 4, wherein said clutch device is disposed within said brake piston; adjacent said one brake shoe.

6. An actuating device according to claim 5, wherein said clutch device includes a radially projecting nose which engages a circumferential recess on the inner surface of said brake piston, said recess having a circumferential length corresponding to said predetermined clearance.

7. An actuating device according to claim 4, wherein said clutch device is disposed within said brake piston adjacent said one brake shoe and includes a radially projecting nose which engages a circumferential recess on the inner surface of said brake piston, and a disc disposed in friction contact with said actuating spindle, said nose being disposed on the periphery of said disc, and said recess having a circumferential length corresponding to said predetermined clearance.

8. An actuating device according to claim 6, wherein said clutch device includes a one-way clutch secured to said actuating spindle, said one-way clutch having a radial projection carrying said nose.

9. An actuating device according to claim 2, wherein said rotation-preventing means is releasable,
    first means are provided in said actuating spindle to lock said actuating nut and said actuating spindle together upon release of said rotation-preventing means, and
    second means are provided to prevent said brake piston from rotating.

10. An actuating device according to claim 9, wherein
    said brake piston includes an axial groove in the outer surface thereof, and a first rotation-preventing pin extendable from said caliper into said groove to prevent rotation of said brake piston, said first rotation-preventing pin being slidable in said groove.

11. An actuating device according to claims 9 or 10, wherein
said actuating nut includes a first portion remote from said one brake shoe which extends radially past the adjacent end of said brake piston up to adjacent the inner surface of said axial bore and a second portion integral with said first portion parallel to the inner surface of said axial bore, said second portion having a longitudinal slot therein in which a second rotation-preventing pin projects from said caliper.

12. An actuating device according to claim 11, wherein
said actuating spindle includes a radially extending flange disposed adjacent said first and second portions, said flange including in its periphery a radially extending bore and a spring loaded tappet disposed in said radial bore aligned with said second rotation-preventing pin to engage said longitudinal slot when said second rotation-preventing pin is withdrawn from said longitudinal slot to lock said actuating nut and said actuating spindle together.

13. An actuating device according to claim 12, wherein
said actuating spindle is supported at the closed end of said axial bore remote from said one brake shoe by a needle bearing.

14. An actuating device according to claim 12, wherein
said clutch device is rotatable within said brake piston when said predetermined clearance has not been exceeded and entrains said brake piston when said predetermined clearance has been exceeded to cause a rotation of said brake piston to effect said adjustment when said actuating spindle turns back after said actuation.

15. An actuating device according to claim 14, wherein
said clutch device is disposed adjacent said one brake shoe.

16. An actuating device according to claim 15, wherein
said clutch device includes a radially projecting nose which engages a circumferential recess on the inner surface of said brake piston, said recess having a circumferential length corresponding to said predetermined clearance.

17. An actuating device according to claim 16, wherein
said clutch device includes a disc disposed in friction contact with said actuating spindle, said nose being disposed on the periphery of said disc.

18. An actuating device according to claim 16, wherein
said clutch device includes a one-way clutch secured to said actuating spindle, said one-way clutch having a radial projection carrying said nose.

19. An actuating device according to claim 1, wherein
said actuating spindle is supported at the closed end of said axial bore remote from said one brake shoe by a needle bearing.

20. An actuating device according to claim 19, further including
a ball bearing thread disposed between said actuating spindle and said actuating nut.

21. An actuating device according to claim 1, further including
a ball bearing thread disposed between said actuating spindle and said actuating nut.

22. An actuating device according to claim 1, wherein
said brake piston is axially slidable in and secured against rotation in said axial bore and includes a hollow adjusting nut on the inner surface thereof, said adjusting nut being secured against axial movement but rotatable with respect to said brake piston and including on the inner surface thereof said second thread,
said clutch device acts on adjacent ends of said spindle and said adjusting nut, and
said adjustment is effected by said adjusting nut being turned in said first and second threads by means of said actuating spindle turning back after said actuation through said clutch device.

23. An actuating device according to claim 22, further including
a ball bearing thread disposed between said actuating spindle and said actuating nut.

24. An actuating device according to claim 22, wherein
said clutch device is rotatable within said adjusting nut when said predetermined clearance has not been exceeded and entrains said adjusting nut when said predetermined clearance has been exceeded to cause a rotation of said adjusting nut to effect said adjustment when said actuating spindle turns back after said actuation.

25. An actuating device according to claim 24, wherein
said clutch device is disposed within said adjusting nut adjacent said one brake shoe.

26. An actuating device according to claim 25, wherein
said clutch device includes a radially projecting nose which engages a circumferential recess on the inner surface of said actuating nut, said recess having a circumferential length corresponding to said predetermined clearance.

27. An actuating device according to claim 26, wherein
said clutch device includes a disc disposed in friction contact with said actuating spindle, said nose being disposed on the periphery of said disc.

28. An actuating device according to claim 26, wherein
said clutch device includes a one-way clutch secured to said actuating spindle, said one-way clutch having a radial projection carrying said nose.

29. An actuating device according to claim 22, wherein
said rotation-preventing means is releasable,
first means are provided in said actuating spindle to lock said actuating nut and said actuating spindle together upon release of said rotation-preventing means, and
second means are provided to prevent said brake piston from rotating.

30. An actuating device according to claim 29, wherein
said brake piston includes an axial groove in the outer surface thereof, and a first rotation-preventing pin extendable from said caliper into said groove to prevent rotation of said brake piston, said first rotation-preventing pin being slidable in said groove.

31. An actuating device according to claims 29 or 30, wherein
said actuating nut includes a first portion remote from said one brake shoe which extends radially past the adjacent end of said brake piston up to adjacent the inner surface of said axial bore and a second portion integral with said first portion parallel to the inner surface of said axial bore, said second portion having a longitudinal slot therein into which a second rotation-preventing pin projects from said caliper.

32. An actuating device according to claim 31, wherein
said actuating spindle includes a radially extending flange disposed adjacent said first and second portions, said flange including in its periphery a radially extending bore and a spring loaded tappet disposed in said radial bore aligned with said second rotation-preventing pin to engage said longitudinal slot when said second rotation-preventing pin is withdrawn from said longitudinal slot to lock said actuating nut and said actuating spindle together.

33. An actuating device according to claim 32, wherein
said actuating spindle is supported at the closed end of said axial bore remote from said one brake shoe by a needle bearing.

34. An actuating device according to claim 32, wherein
said clutch device is rotatable within said brake piston when said predetermined clearance has not been exceeded and entrains said brake piston when said predetermined clearance has been exceeded to cause a rotation of said brake piston to effect said adjustment when said actuating spindle turns back after said actuation.

35. An actuating device according to claim 34, wherein
said clutch device is disposed within said brake piston adjacent said one brake shoe.

36. An actuating device according to claim 35, wherein
said clutch device includes a radially projecting nose which engages a circumferential recess on the inner surface of said brake piston, said recess having a circumferential length corresponding to said predetermined clearance.

37. An actuating device according to claim 36, wherein
said clutch device includes a disc disposed in friction contact with said actuating spindle, said nose being disposed on the periphery of said disc.

38. An actuating device according to claim 36, wherein
said clutch device includes a one-way clutch secured to said actuating spindle, said one-way clutch having a radial projection carrying said nose.

39. An actuating device according to claim 1, wherein
said rotation-preventing means is releasable,
first means are provided in said actuating spindle to lock said actuating nut and said actuating spindle together upon release of said rotation-preventing means and
second means are provided to prevent said brake piston from rotating.

40. An actuating device according to claim 39, wherein
said brake piston includes an axial groove in the outer surface thereof, and
a first rotation-preventing pin extendable from said caliper into said groove to prevent rotation of said brake piston, said first rotation-preventing pin being slidable in said groove.

41. An actuating device according to claim 39, wherein
said actuating nut includes a first portion remote from said one brake shoe which extends radially past the adjacent end of said brake piston up to adjacent the inner surface of said axial bore and a second portion integral with said first portion parallel to the inner surface of said axial bore, said second portion having a longitudinal slot therein into which a rotation-preventing pin projects from said caliper.

42. An actuating device according to claim 41, wherein
said actuating spindle includes a radially extending flange disposed adjacent said first and second portions, said flange including in its periphery a radially extending bore and a spring loaded tappet disposed in said radial bore aligned with said second rotation-preventing pin to engage said longitudinal slot when said second rotation-preventing pin is withdrawn from said longitudinal slot to lock said actuating nut and said actuating spindle together.

43. An actuating device according to claim 42, wherein
said actuating spindle is supported at the closed end of said axial bore remote from said one brake shoe by a needle bearing.

44. An actuating device according to claim 42, wherein
said clutch device is rotatable within said brake piston when said predetermined clearance has not been exceeded and entrains said brake piston when said predetermined clearance has been exceeded to cause a rotation of said brake piston to effect said adjustment when said actuating spindle turns back after said actuation.

45. An actuating device according to claim 44, wherein
said clutch device is disposed within said brake piston adjacent said one brake shoe.

46. An actuating device according to claim 45, wherein
said clutch device includes a radially projecting nose which engages a circumferential recess on the inner surface of said brake piston, said recess having a circumferential length corresponding to said predetermined clearance.

47. An actuating device according to claim 46, wherein
said clutch device includes a disc disposed in friction contact with said actuating spindle, said nose being disposed on the periphery of said disc.

48. An actuating device according to claim 46, wherein
said clutch device includes a one-way clutch secured to said actuating spindle, said one-way clutch having a radial projection carrying said nose.

* * * * *